United States Patent [19]
Boulanger

[11] Patent Number: 5,587,988
[45] Date of Patent: Dec. 24, 1996

[54] COMPUTER CONTROLLED DISK STORAGE UNIT WITH A TELESCOPIC ARM FOR READING AND WRITING INFORMATION ON A DISK LOCATED IN A MAGAZINE

[76] Inventor: Gilles Boulanger, 2100 Route 112 #106, Magog, Quebec, Canada, J1X 5X4

[21] Appl. No.: 153,917

[22] Filed: Nov. 17, 1993

Related U.S. Application Data

[63] Continuation of PCT/CA93/00100, Mar. 19, 1993.

[51] Int. Cl.⁶ .................................................. G11B 17/24
[52] U.S. Cl. ............................................................. 369/178
[58] Field of Search ................................... 369/34, 36, 37, 369/38, 178, 180, 192, 199, 206; 360/91

[56] References Cited

U.S. PATENT DOCUMENTS

| | | | |
|---|---|---|---|
| 1,998,461 | 4/1935 | Kucher | 369/180 |
| 2,514,701 | 7/1950 | Landberg et al. | 369/38 |
| 2,690,913 | 10/1954 | Rabinow | 274/10 |
| 4,791,626 | 12/1988 | Staar | 369/37 |
| 5,045,741 | 9/1991 | Dvorsky | 310/209 |
| 5,111,709 | 5/1992 | Torii et al. | 74/89.15 |

*Primary Examiner*—Stuart S. Levy
*Assistant Examiner*—William R. Korzuch

[57] ABSTRACT

A computer controlled disk storage unit operating much like a jukebox but having the read/write mechanism moving to access a series of digital disks instead of the usual jukebox methods which consist of moving the disks to where the read/write system is. In the machine described here, the disks are accessed while staying inside their individual storage compartments, called "slots" in this application.

3 Claims, 8 Drawing Sheets

COMPUTER CONTROLLED DISK STORAGE UNIT WITH A TELESCOPIC ARM FOR READING AND WRITING INFORMATION ON A DISK LOCATED IN A MAGAZINE

BACKGROUND OF THE INVENTION

This is a continuation application of PCT/CA93/00100 filed Mar. 19, 1993.

1/ Field of the Invention

This invention relates generally to digital storage apparatus, and more particularly to an automatic disk changer apparatus for selecting and playing another of a plurality of digital discs without the need for moving the disks out of their slots.

2/ Description of the Relevant Art

Although this apparatus can be used for any type of disk memory storage medium, the preferred configuration is for the optical data storage disks which comprise the CD-ROM, the WORM (write once read many times) and the rewritable disks and, with the increasing number of home computers, because of the simplicity of its mechanism and the compactness of its size, such an apparatus could be mass produced for a price suitable for the residential market where it could be used simultaneously for changing audio CDs. Photo CDs and another types of data CDs. Because of their huge storage capacities, anywhere from 128 MB all the way up to 1 gigabyte or more, optical disks are gaining in popularity in the business world for archiving purposes. And, with the magneto-optical disks phase change disks, which can be written and read many times, their usage is increasing as an alternative to slower magnetic tape storage units and to lower capacity magnetic hard disks and floppies.

There exists in the marketplace several types of digital disk players that can hold more than one disk. Some models have a rotating platter which can hold up to 5 disks; others have interchangeable cartridges which can hold 6 disks at a time and of course, for larger needs, several variations on the old venerable jukebox configuration.

All of these systems have one thing in common: The disk—often held in a tray, cartridge or magazine (which is either linear or as in my embodiment, toroidal)—has to move to meet with the reading unit. This makes the process slow, increases the number of moving parts, thus the cost and size of the apparatus, and may also reduce reliability.

Other systems can hold several disks, generally in a linear magazine set either horizontally or vertically in which case the disks remain in place and a reading mechanism is brought about to read or write information to said disks. These systems, however, do not appear to be made to facilitate the installation or removal of individual disks, one has to practically dismantle the machine in order to extract or install a disk. Furthermore, these units have a large central motor that spins all of the disks simultaneously and have a separate motor mechanism to move a read/write apparatus in line with a selected disk and yet another motor mechanism to move the said apparatus over the said disk to read or write it.

SUMMARY OF THE INVENTION

The principal object of the present invention is to provide a simple, reliable and economically realized apparatus which can store a large number of recording media including compact disks, hard magnetic disks and soft disks (such as floppies).

It is another object of the present invention to provide a changing apparatus which can be operated horizontally, vertically, or in any other attitude.

To attain these ends, the present invention is embodied in the form of a two prong telescopic arm, said telescopic arm comprised of a read/write means and a single motor, said motor can firstly, position the telescopic arm in line with a selected disk and secondly, after the telescopic arm extends both of its prongs, can engage said disk into rotation. This drive (the word "drive" refers to the positioning of the telescopic arm and the spinning of disks) & read/write means embodied in the form of a telescopic arm is very light and, with the toroidal configuration of the magazine, can, by spinning along a vertical axis, reach any disk in a fraction of a second by rotating never more than 180 degrees and—without removing the disk from its slot—can engage it into rotation by using the same single motor.

Depending upon the intended usage of the apparatus, the design provides for the installation of two or more drive & read/write telescopic arms allowing several users to be able to access different disks simultaneously. This configuration could, in the case of audio CDs, allow the mixing of tunes, especially useful for disk jockeys in radios or clubs as well as for home entertainment.

Also, the mechanisms involved in this invention allow for flexibility in the design of the toroidal magazine so as to allow for the variety of digital disk formats available on the market such as WORMs and rewritable disks which come in two sizes (3½ inch. and 5¼ inch) and, unlike their more famous cousins, the audio CDs, are generally packed inside a square cartridge, not unlike that of floppy disks. One could see that a different slot design incorporating some of the designs—which will be further discussed in this documentation—would be required for such disks and may, in the future, require other patents, if applicable.

DESCRIPTION OF THE PREFERRED EMBODIMENTS

Figure 1:
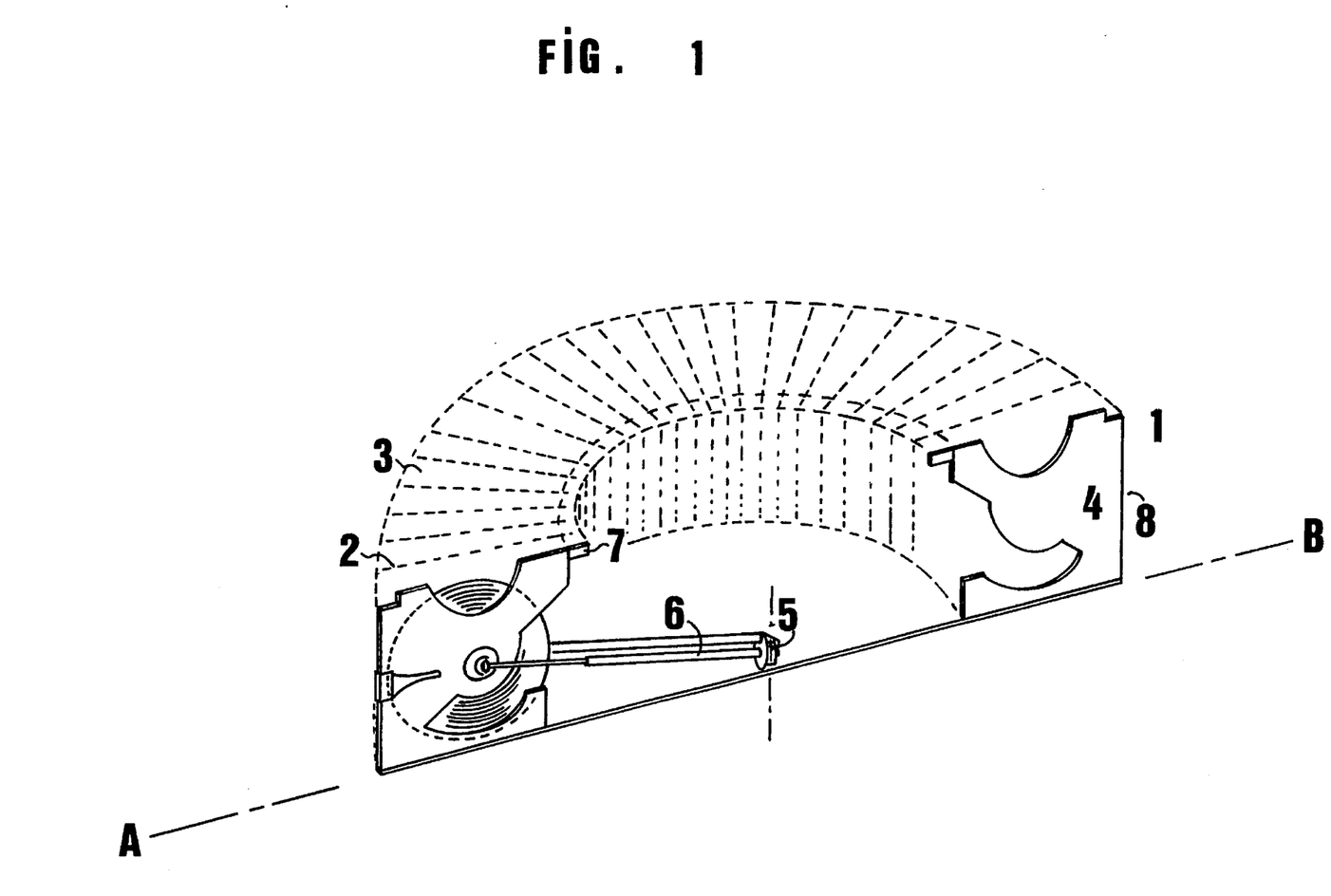
FIG. 1 is an isometric view, partially cut-off, of the apparatus showing the toroidal configuration of the magazine as well as the drive & read/write telescopic arm currently engaged onto a disk.

In FIG. 1, the isometric, cut-off view of the machine 1, we see a series of slots 2 making up a toroidal magazine 3 which is centred around a vertical axis 5 around which rotates a telescopic arm 6. A ring 7 strengthens the toroidal magazine 3. Also on this figure, a special slot 4, which will be described later, is situated in line with a front door 8 that is used for loading an occasional disk.

Figure 2:
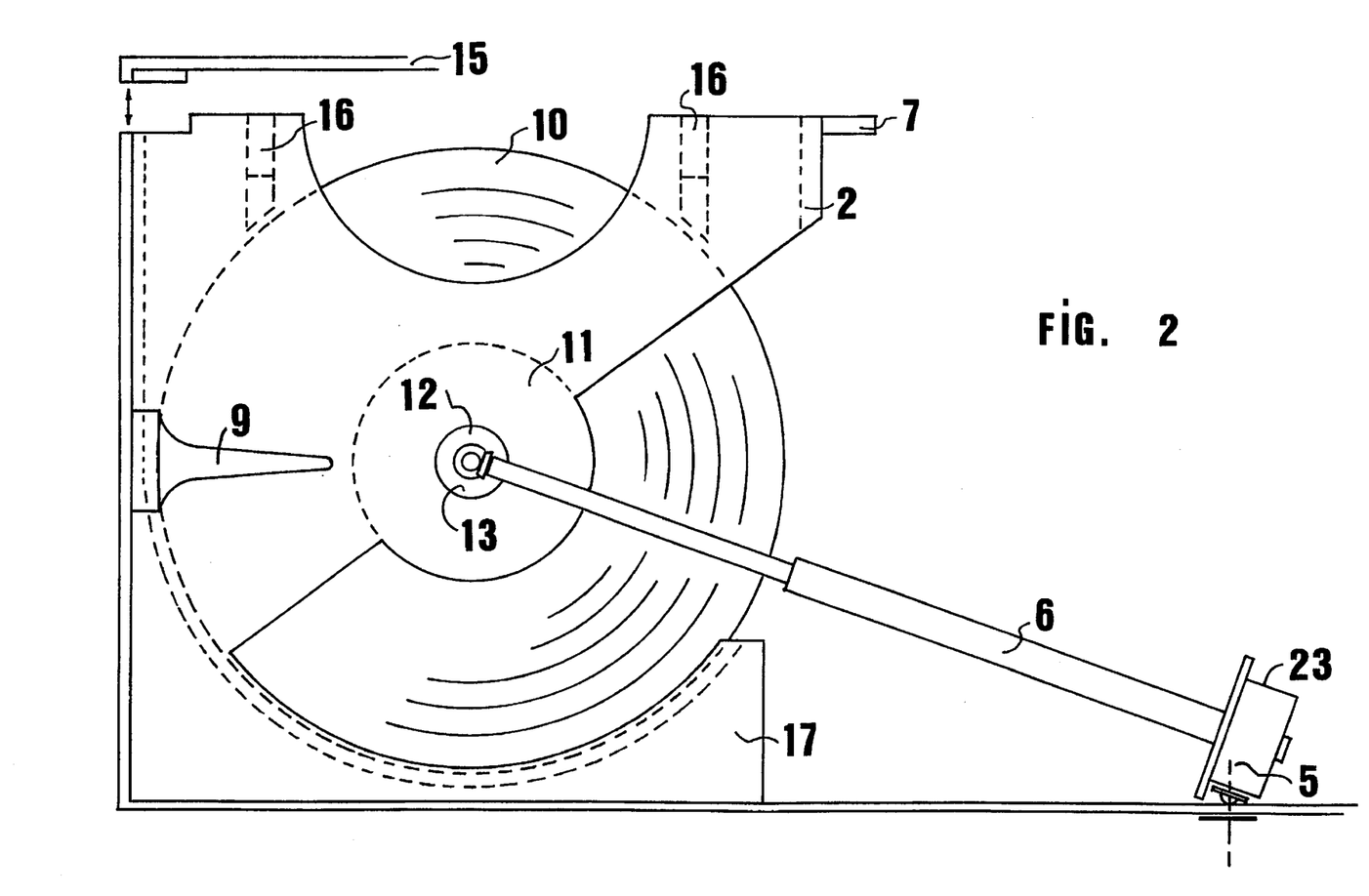
FIG. 2 Shows in greater detail a side view cut along the line A-B of FIG. 1 of the telescopic arm as well as the holding mechanism of the disk slot.

FIG. 2 shows a detailed side view of the slot 2 and the telescopic arm 6 with the motor 23 at its base over the vertical axis 5. In order to make the best use of space, the telescopic arm 6 is inclined at about 20 degrees from the horizontal, the advantages of such a design become apparent in practice. The slot 2 holds a disk 10 which is secured in place by a set of pressure plates 11 (only one visible) on either side of the disk 10. To firmly hold and center the said disk, a set of bevelled rubber caps 12 (only one visible) on either side of the disk fit inside the center hole 13 of the disk 10. In order to create pressure from the pressure plates 11, two leaf springs 9 (only one visible) are used on either side of the slot 2. To install or remove a disk 10, in this present embodiment, a removable lid 15 is pulled out and the disk 10 is slid inside the slot 2 much like a slice of bread inside a toaster. A set of four wedges 16, two on each side of the interior panels of the slot 2 allow the said slot to spread apart just enough to separate the two pressure plates 11 and the rubber caps 12 to allow the disk 10 to be pushed all the way down to the saddle 17 of the slot 2 at which point the disk 10 has left the wedges 16 so that the leaf springs 9 can squeeze the slot's 2 side panels which causes the rubber caps 12 to snap the disk 10 firmly in place by pulling it about one millimeter off of the saddle 17. In this manner, there is no contact between the disk 10 and the slot 2 except of course for the two pressure plates 11 and rubber caps 12. The pressure plates 11 are freely rotating against the slot 2 while at the same time holding firmly the disk 10 in much the same way as is done in existing players. To facilitate installation or removal of the disks 10, enough plastic is cut out from the top of the slot 2 to allow for fingers to firmly grab the disk 10 and pull it up. The wedges 16 have two bevelled ends, meaning that it is as easy to pull the disk out as it is to put it in. Also shown is the location of the ring 7 that holds all of the slots together.

Figure 3A:
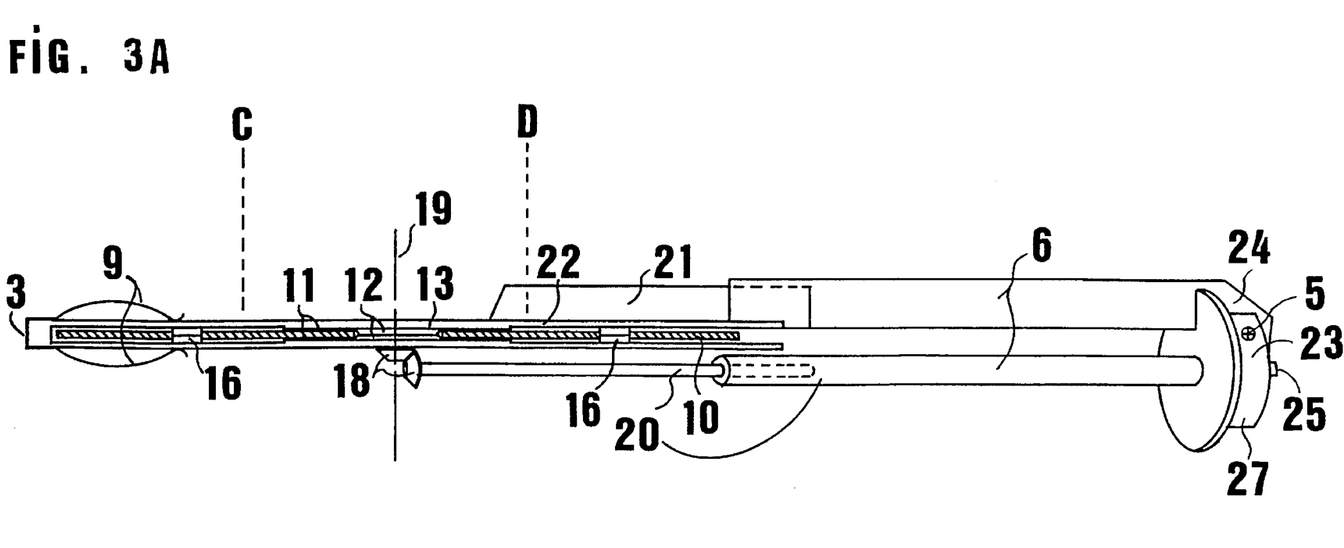
FIG. 3a, 3b show a top view of FIG. 2 to illustrate how the disk is held in place with details of the pressure plates and centering mechanism in FIG. 3b.
Figure 3B:
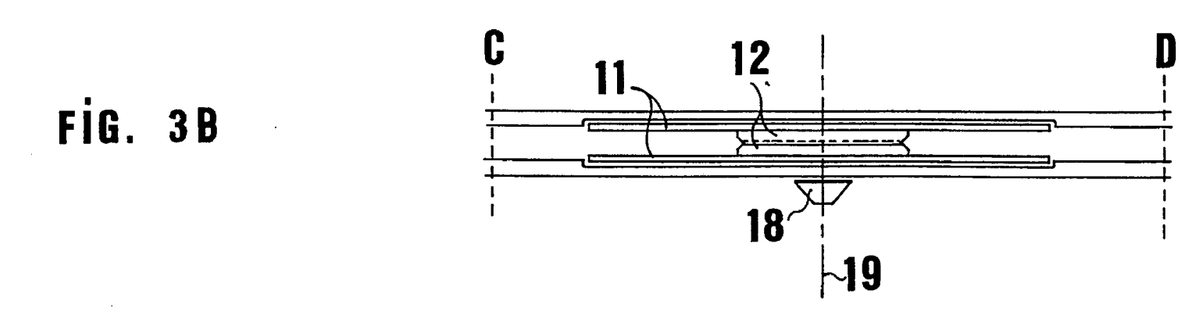
Figure 4:
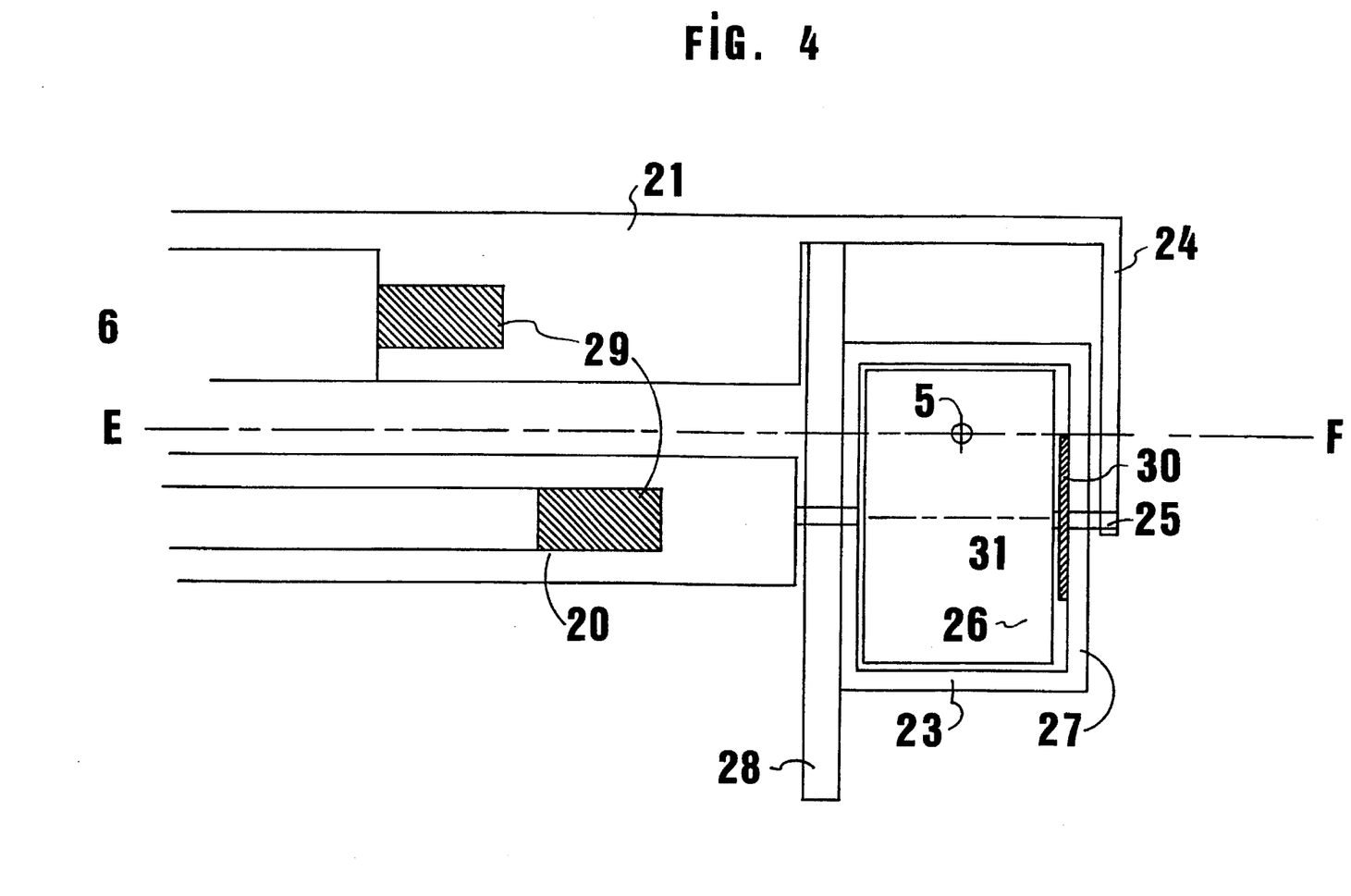
FIG. 4 Shows the motor part of the telescopic arm in greater detail.

FIG. 3a, and a blown up view in FIG. 3b (between C-D) show a top view of the content of FIG. 2, to better illustrate the action of the pressure plates 11 (FIG. 3b) the rubber caps 12 inside the hole 13 of the disk 10, the wedges 16 and the two leaf springs 9. These views also show the two friction gears 18 that transmit the drive power from the drive shaft prong 20 to spin the disk 10 around its axis 19. The drive shaft prong 20 is made up of two interlocking sections not unlike a telescopic radio antenna. The read/write prong 21 engages into a notch 22 to firmly hold the telescopic arm 6. The drive shaft prong 20 connects directly into the motor 23 while the data read/write prong 21 connects to an armature 24 that holds together the said data read/write prong 21 with the motor axis 25 and the vertical axis 5 of the telescopic arm 6. In order to have a single motor 23 perform both the duty of moving the telescopic arm 6 around and into proper alignment with a disk 10 and also spin said disk, both the rotor (26 shown in FIG. 4) and the stator 27 are used to do each of the two operations. The details of the workings are described in the next figure. FIG. 4 shows in greater detail the workings of the motor 23. We can seethe rotor 26 connected to the drive shaft prong 20; the stator 27 which is fused to a wheel 28, said wheel is not connected to the drive shaft prong 20. The motor axis 25 does not rotate and is fixed to an armature 24 which connects to the vertical axis 5, continues around the wheel 28 to reach the data read/write prong 21. In order to protract and retract the data read/write prong 21 as well as the drive shaft prong 20. two linear motors 29 are used. When it is required to move to another disk, the telescopic arm 6 quickly retracts making it free to move to a new position. Once aligned in the axis of a slot (along the E-F plane), the two prongs 20 and 21 are again protracted to engage into a read/write operation. As mentioned earlier, a single motor 23 performs two separate functions: the first one being the translation of the telescopic arm 6 around a vertical axis 5, this is accomplished when power is applied to the motor 23 while the rotor 26 is locked in place by a disk brake 30. In this manner, the stator 27 is free to spin the wheel 28, thus moving the telescopic arm 6 around the vertical axis 5 to a given position. The disk brake 30 itself is prevented from spinning by a notch cut into the motor axis 25 which, as stated above, does not rotate. A simple solenoid 31 wrapped around the motor axis 25 takes care of shifting the disk brake 30 between the rotor 26 and the stator 27. When the disk brake 30 shifts onto the stator 27 as illustrated, the motor 23 enters into its second function, namely to let the rotor 26 spin, which activates the drive shaft prong 20. By looking at the figure, one notices that the vertical axis 5 is not at the center of the motor 23 as one might expect, it is rather along the line E-F which runs along the plane of the edge of the disk. That way, the drive shaft prong 20 which is a continuation of the shaft of the motor 23 can extend to the side of the disk. With the use of a motor 23 controlled by a computer and with a very simple computer routine, the wheel 28 can be rotated to exactly the right position by the shortest route (left or right turn). Additional device drivers synchronise the various mechanisms that execute the actions of the disk brake 30; rotor 26; stator 27; linear motors 29; and so on. Not illustrated here is the conduit through which all of the necessary wiring would pass. That conduit would go through the vertical axis 5 and would be a shaft with a series of metal rings allowing continuous contact. Variations on such means have been known and used in various apparatus and is not the subject of this present invention. Besides the computer and electronic functions required to control the operations specific to this invention, it should be understood that said invention would also contain various features found on existing CD machines, functions such as those used to control the positioning of the reading mechanism that locates specific sectors on an audio or digital CD. It would be beyond the scope of the specifics of the claims of this invention to describe in detail all of the features available on the various embodiments of this invention.

Figure 5:
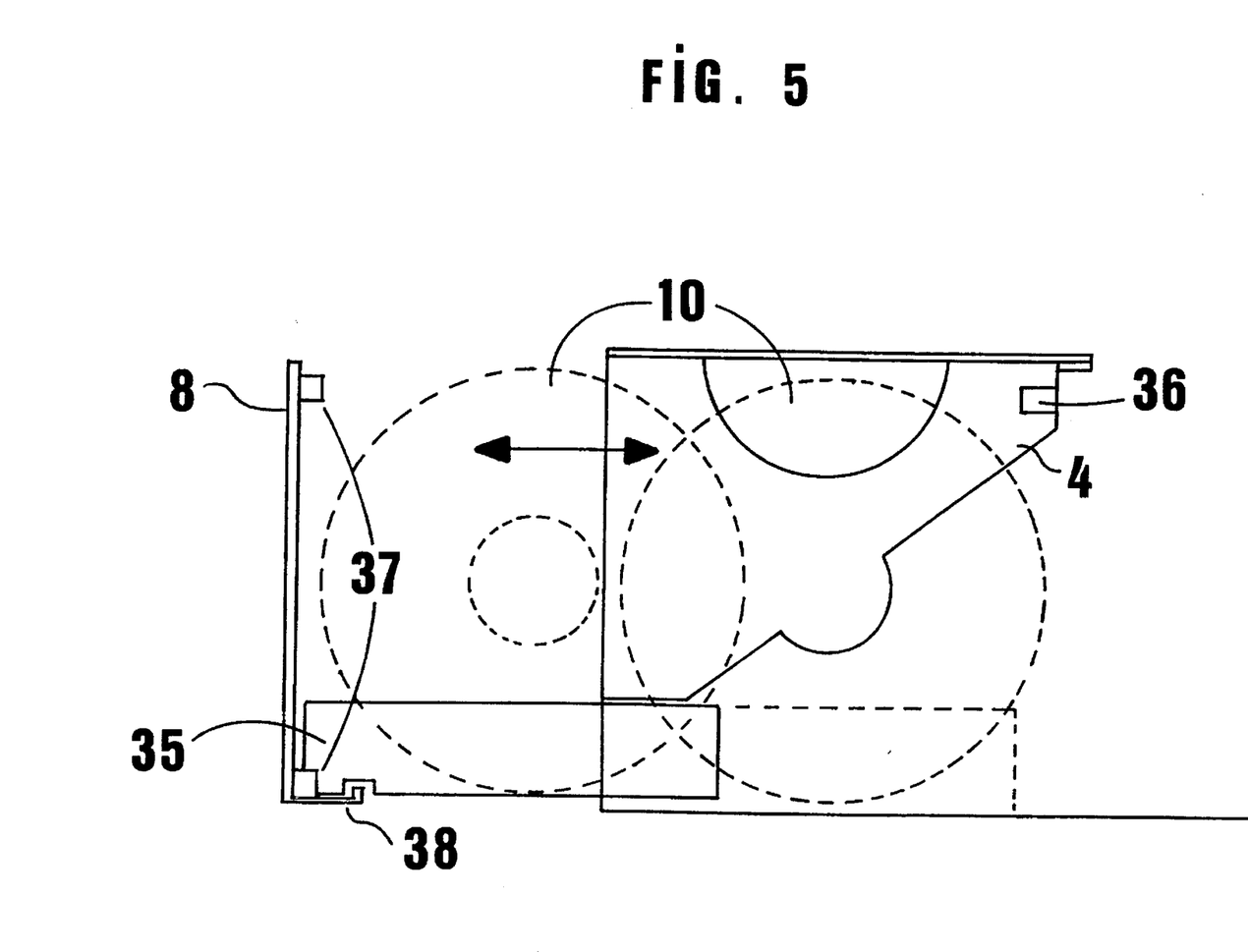
FIG. 5 shows the workings of the front loading mechanism for an occasional disk.

Certain features need to be addressed though and they are:

FIG. 5 shows the side of the special slot 4 and illustrates how a disk 10 can be introduced into this said special slot. When a user presses the "eject" button, the front door 8 slides out, taking with it a disk 10 held in a modified saddle 35 that is separate from the rest of the special slot 4 and has two raised sides to hold the disk 10 vertically while said disk is out of the special slot 4. This special slot 4 differs in other ways from the other slots as it has a different set of springs 36 which normally pull the two side panels of said special slot apart to allow a disk 10 to easily slide out of it. A set of bevelled pins 37 attached to the front door 8 holds the two side panels of the special slot 4 together when the said front door is closed. Thus, when the front door 8 begins its movement, the modified saddle 35 is not yet engaged but the bevelled pins 37 are and quickly disengage from the side panels of the special slot 4 at which point a hook 38 engages the modified saddle 35 resulting in the disk 10 being moved out. When putting a disk 10 back in, the reverse applies: When said disk has reached its final position, the front door 8 continues for a bit, just enough to engage the bevelled pins 37 that close the side panels of the special slot 4 thus snapping the disk 10 in its proper position.

Figure 6:
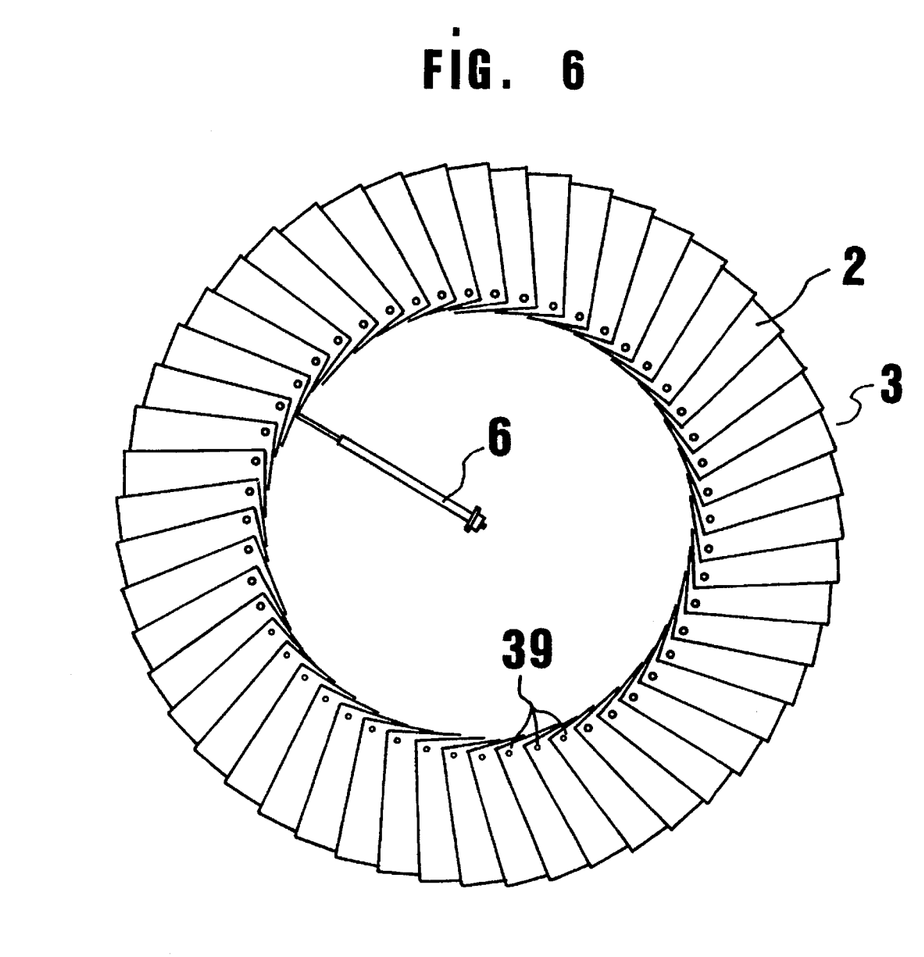
FIG. 6 describes an alternate magazine configuration that would reduce the overall height of the disk storage unit by inclining each slot on top of one another.

FIG. 6 illustrates an alternate configuration for the toroidal magazine that allows the computer controlled disk storage unit with a telescopic arm for reading and writing information on a disk located in a magazine to have a lower profile. In this embodiment, each slot 2 is inclined along two axis, the first one at about 20 degrees from the horizontal to accommodate a similar angle from the telescopic arm 6 and the second inclination, self explanatory since each slot overlaps the other and is spaced at about one centimeter from the next to accomodate the passage of the prongs of the telescopic arm 6. Little rods 39 at each one of the slots 2 maintain proper spacing and strength.

Figure 7A:
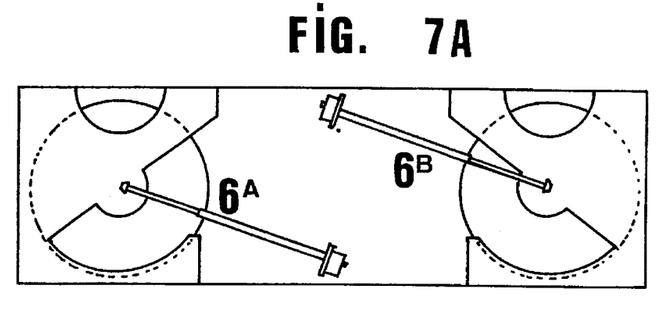
FIGS. 7a, 7b, 7c illustrate various means for installing more than one arm in one digital disk changer apparatus.

FIG. 7a is a side view of the unit that shows how a second telescopic arm 6b can easily be fitted in without in any way constricting the movement of the other telescopic arm 6a.

Figure 7B:
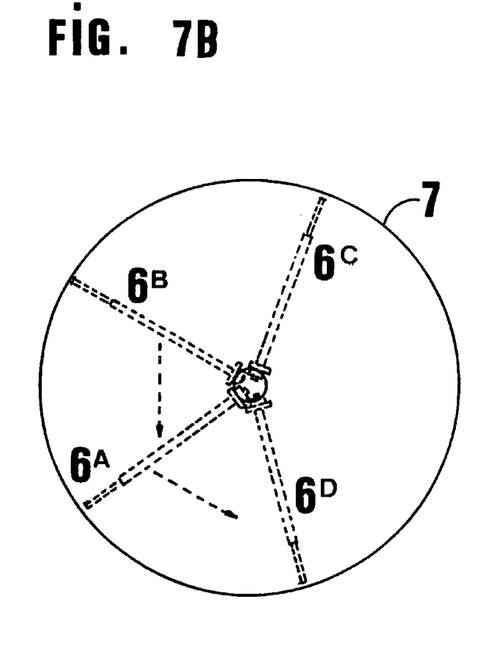

FIG. 7b is a top view showing four telescopic arms 6 a,b,c,d, all of them different from the two arms of FIG. 7a. inside the toroidal magazine of which only the ring 7 can be seen. This embodiment could be useful in cases where a machine holds different types of digital disks such as CD-ROMs, WORMs and rewritables in different types of slots. It could also work with machines holding only one type of disk except that a sophisticated allocation system would have to be incorporated to reassign lets say, telescopic arm 6a during a pause from a user to a new disk while telescopic arm 6b takes the original position of telescopic arm 6a so that the first user can still get his information and another user can retrieve information on a new disk, something telescopic arm 6b couldn't do because telescopic arm 6a was blocking its access and that telescopic arm 6d was needed for a third user.

Figure 7C:
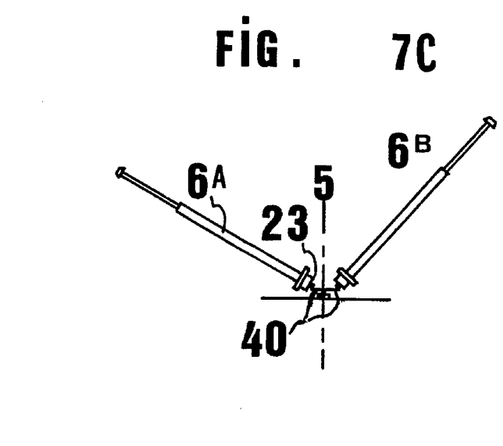

FIG. 7c is a side view that shows how two telescopic arms 6a and 6b as in FIG. 7b, can rotate in the same plane simply by adding a small member 40 to each of said telescopic arm. This way, the motor 23 does not rotate above the vertical axis 5 and can thus allow room for more than one telescopic arm. This configuration illustrates how by varying the angle of the telescopic arms 6a or 6b disks of varying sizes and types can be accommodated within the same machine.

Figure 8A:
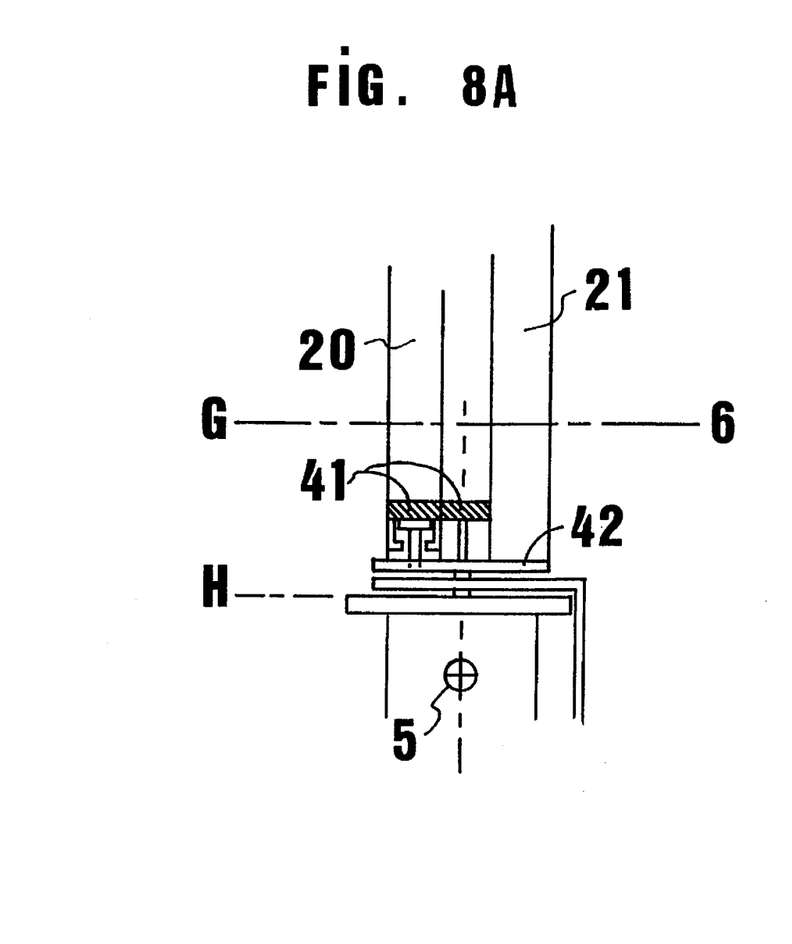
FIGS. 8a, 8b illustrate two views of an alternate telescopic am design that permits reading both faces of a disk.
Figure 8B:
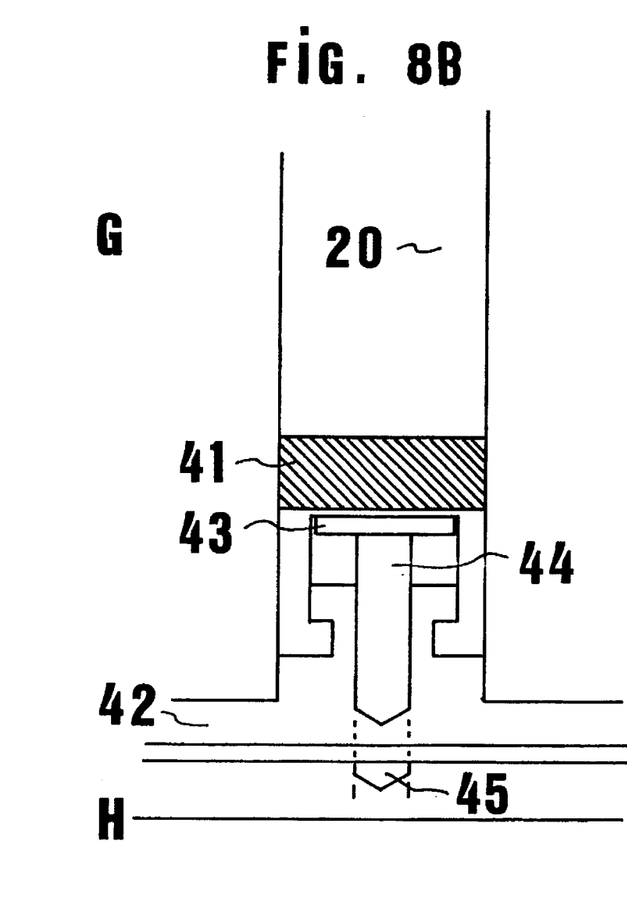

FIG. 8a, and a blown up view in FIG. 8b (between G-H) show how a different embodiment of the telescopic arm 6 could allow said telescopic arm to read both faces of a disk since some types of digital disks store information on both faces. In this embodiment, the vertical axis 5 is centered relative to the motor and a set of toothed gears 41 are needed to put the drive shaft prong 20 to the side so that the said drive shaft prong protracts to the side of the disk and not onto it. Both the data read/write prong 21 and the drive shaft prong 20 are held together by a rectangular plate 42.

FIG. 8b shows a second disk brake 43 locking the toothed gear 41 which is part of the drive shaft prong 20. In doing so, the other toothed gear, which is connected to the rotor, rotates the rectangular plate 42 180 degrees in order to position the drive shaft prong 20 onto the other face of the disk. Once in position, the second disk brake 43 releases the toothed gear 41 as well as the pin 44 which enters its hole 45 to lock the rectangular plate 42 in its new place. It should be noted that there are two holes 45, one for each of the two positions. For this particular variation, a design change would be needed for the slots so that they would have a friction gear on both side panels as well as two notches to accommodate the data read/write prong 21. In these descriptions I have used the terminology "digital disks" and "digital read/write" so as not to exclude the possibility for manufacturers to use the digital disk changer apparatus herein described for use with magnetic hard disks or even magnetic floppy diskettes.

I claim:

1. A computer controlled disk storage unit used for selecting any one of a plurality of disks and reading and/or writing from and onto any of the said disks, said unit comprising:

a toroidal magazine means comprising a plurality of slots to hold individual disks in place and to allow rotation of said disks when information is to be read from or written to said disks, each one of said slots includes a pressure plate on each side of the slot located on the inside of the slot so that the pressure plates are freely rotating against said slot for firmly holding the disks, rubber caps on each side of the slot located on the inside of the slot with each rubber cap adjacent a side of one of said pressure plates, said rubber caps fit inside a center hole of one of said plurality of disks to firmly hold and center the disk, and a friction gear on one side of the slot located on the outside of the slot on a side of one of the pressure plates opposite to the side the rubber cap is located on;

a player/recorder means embodied in the form of a telescopic arm situated in the middle of the toroidal magazine and able to align itself with any one of the slots containing disks and said telescopic arm provided with means for extending itself to reach any one of said disks situated inside any one of said slots to rotate and read or write information from and onto said disk while the disk is in said slot;

said telescopic arm made of two parallel prongs extending outwardly from its base, one of said prongs being a drive shaft with a second friction gear on one end of said shaft that engages with the friction gear located on the outside of the slot of a selected disk to induce rotation using power from a motor situated at the base of the telescopic arm, and the other of said prongs holding a data reading/writing means to read and/or write data from/onto said selected disk in said slot.

2. The computer controlled disk storage unit as described in claim 1, wherein said plurality of slots are inclined to reduce the amount of space used.

3. The computer controlled disk storage unit as described in claim 1, wherein said disk storage unit contains more than one telescopic arm.

\* \* \* \* \*